Oct. 8, 1940.  R. A. BAUDRY  2,217,430
WATER-COOLED STATOR FOR DYNAMOELECTRIC MACHINES
Filed Feb. 26, 1938  2 Sheets-Sheet 1

WITNESSES:
Leon M. Garman
F. P. Lyle

INVENTOR
Rene' A. Baudry.
BY
ATTORNEY

Patented Oct. 8, 1940

2,217,430

UNITED STATES PATENT OFFICE 2,217,430

WATER-COOLED STATOR FOR DYNAMO-ELECTRIC MACHINES

René A. Baudry, Pittsburgh, Pa., assignor to Westinghouse Electric & Manufacturing Company, East Pittsburgh, Pa., a corporation of Pennsylvania Application February 26, 1938, Serial No. 192,760

5 Claims. (Cl. 171—252)

This invention relates to the cooling of dynamoelectric machines and, more particularly, it contemplates the provision of means for cooling the stators of large machines by the circulation of water through the stator core.

In dynamoelectric machines of large size, such as turbo-generators, special attention must be given to the ventilation of the machine and an improvement in the cooling may make possible a substantial increase in the rating of a machine of given dimensions. For cooling the stator cores of such machines, it is customary to build them up with the annular laminations assembled together in groups or stacks spaced apart in the direction of the axis of the machine to provide radial ventilating ducts between them. The air or other gaseous cooling medium is blown into the air gap and this air, together with the heated air discharged from ventilating passages that may be provided in the rotor, passes through these ducts to cool the stator iron. The air is then either discharged from the machine or passed through cooling devices and recirculated.

The object of the present invention is to improve the cooling of dynamoelectric machines by providing special cooling devices in the radial ventilating ducts of the stator core in order to more effectively cool the stator iron and also to cool the heated air discharged from the rotor. This result is accomplished by providing cooling elements in the ducts through which water or other suitable liquid cooling medium can be circulated. Provision is made for circulating the water in these cooling elements in a generally radial direction so that the entire radial thickness of the stator core can be effectively cooled, and fins are provided to assist in cooling the air discharged from the rotor.

Figure 1:
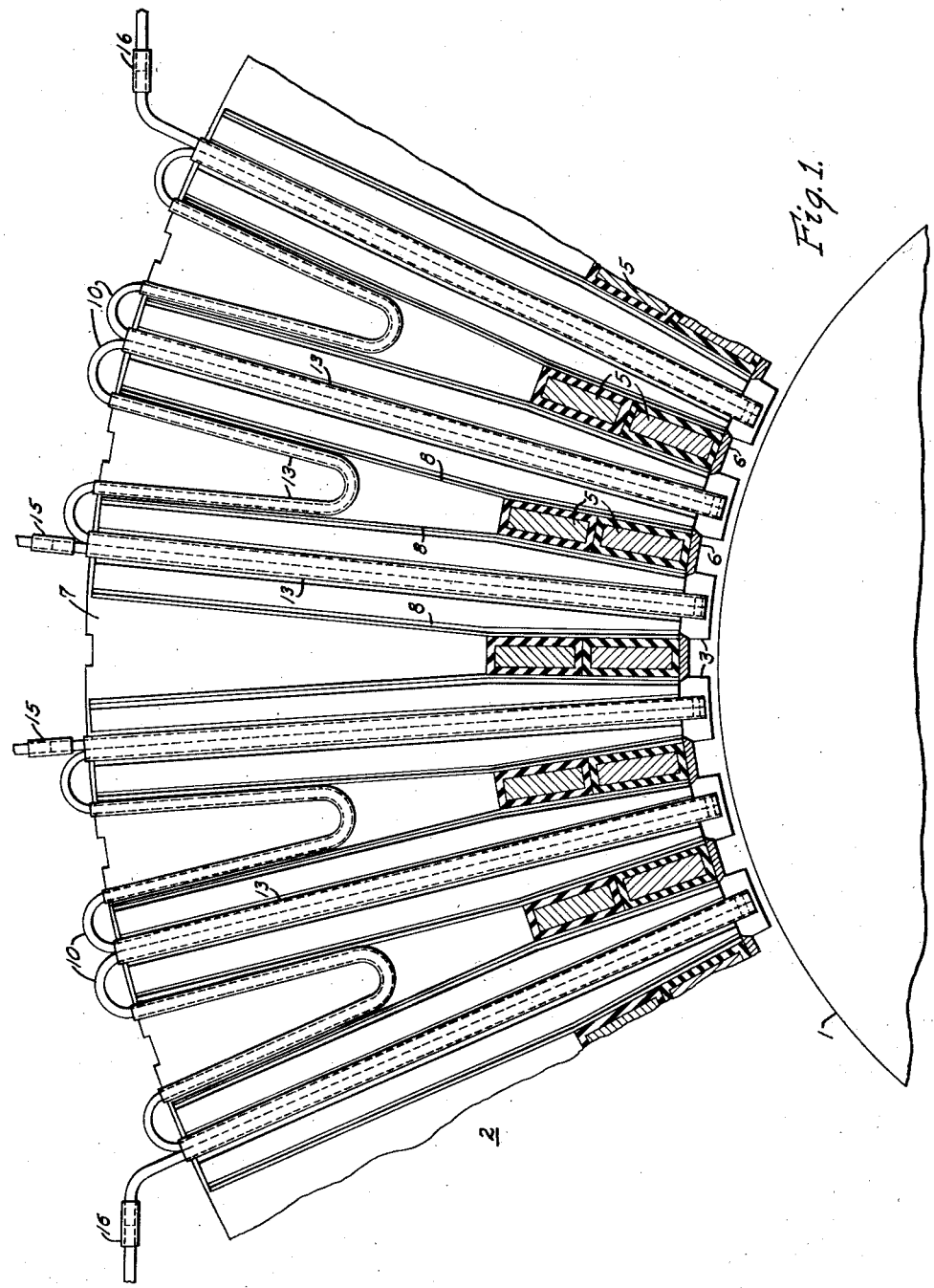
Figure 2:
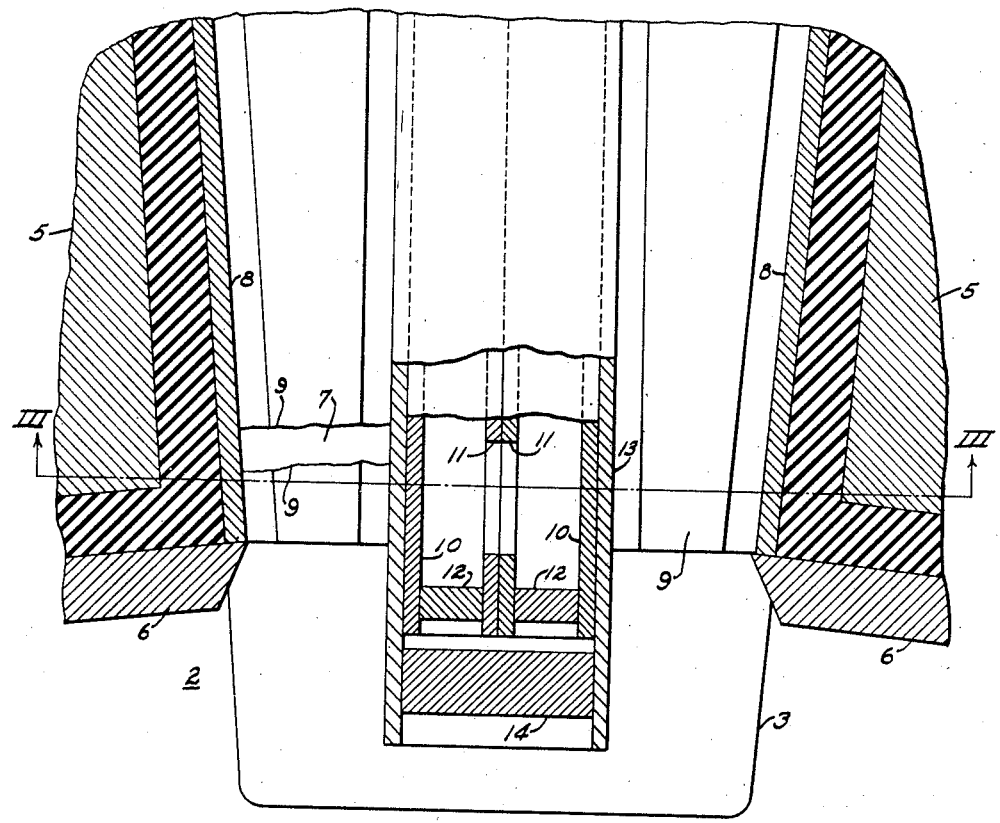
Figure 3:
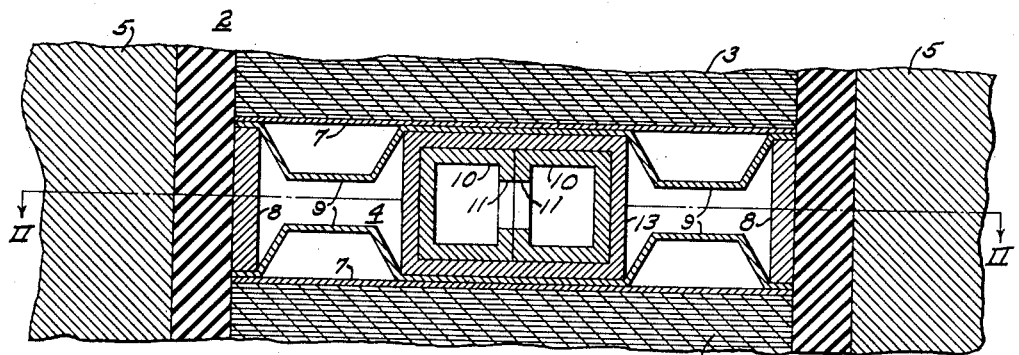

The invention will be more fully understood from the following detailed description taken in connection with the accompanying drawings, in which Figure 1 is a fragmentary transverse section through a large dynamoelectric machine, Fig. 2 is a view of a portion of Fig. 1 on a larger scale, approximately on the line II—II of Fig. 3, and Fig. 3 is a section on the line III—III of Fig. 2.

The machine shown in the drawings comprises a rotor 1 of any desired construction and a stator core 2 which is built up of laminations 3 in the usual manner. The laminations are disposed in groups or stacks spaced apart to provide ventilating ducts 4 between them, only one of which is shown in the drawings. The laminations are provided with generally radial teeth on their peripheries which form longitudinal slots in which the coils 5 of a polyphase armature winding are placed. The slots are closed by suitable wedges 6 in the usual manner.

In order to improve the ventilation of the machine, special cooling elements are provided in the ventilating ducts 4. Only one of these cooling elements has been shown in the drawings, but it is to be understood that such elements are preferably provided in all of the ducts and that they are all of identical construction. Each cooling element consists of two generally annular supporting members 7, which are of substantially the same shape and dimensions as the stator laminations and are preferably made of copper sheet, or other material of good heat conductivity. These members are secured together with copper strips 8 between them which serve as spacing members, so that the total thickness of the cooling element is equal to the width of the ventilating duct. Fins 9, which are also preferably made of copper sheet, are secured between the members 7 and strips 8, as shown in Fig. 3, and are so shaped that they will act in the most efficient manner to facilitate the transfer of heat from the air passing over them.

For the purpose of removing the heat from the air or other gas passing through the cooling elements, water or other liquid cooling medium is circulated through them, and for this purpose tubes or conduits 10 are secured between the members 7. These conduits are preferably made of rectangular copper tubing because of its good heat conductivity and because it can be easily bent to a desired shape. As shown in Fig. 1, the tubes are formed into a substantially W-shape and are placed in the cooling elements so that their long arms are located opposite the teeth of the stator core and between the slots, and they extend radially substantially to the inner ends of the teeth. The adjacent sections of tubing adjoin each other to provide a pair of tubes opposite each tooth, and the tubes of each pair are connected with each other at their inner ends through the openings 11 so as to permit circulation of water through all of the tubes in series. The tubes are closed at their inner ends by plugs 12 and are protected by outer sleeve members or tubes 13 which are also preferably made of copper and which are closed at their inner ends by plugs 14. Water is introduced into the tubes through connections 15 from any suitable source which may be in the form of a conduit or main extending longitudinally for the length of the machine and connected to a suitable external water system. The water passes through the tubes, as indicated above, and is discharged through connections 16 to an external discharge main. As shown in Fig. 1, the water may be introduced into the tubes and discharged from them at several points around the periphery of the stator core in order to insure uniform cooling throughout the circumference. If desired, however, the water might be circulated continuously through all of the tubes successively, or it might be introduced at only two points and circulated through approximately half of the circumference, depending on the size of the machine and the desired efficiency of cooling.

The radial arrangement of the tubes makes it possible for the water to circulate throughout the entire radial thickness of the core from its outer periphery to the inner ends of the teeth and thus insures the most effective cooling of the entire mass of the stator iron. The provision of the outer tube 13 protects the system against leaks in the inner tubes and the arrangement of the tubes in pairs which are connected together only at their ends makes the possibility of a leak very remote at any points, except where they are easily accessible for repair. This arrangement also permits access to the tubes for removal and replacement, if necessary, without dismantling the stator core, since the tubes can be reached from the outside of the core and from the air gap.

In operation, the heated air which passes through the air gap and which is discharged into it by the rotor passes through the radial ducts 4 and is cooled by the water circulating in the tubes 10 and this cooling action is facilitated and improved by the effect of the fins 9 over which the air passes. The circulating water also removes the heat from the stator core and provides much more effective cooling than if the air passing through the ducts were relied on alone, as is usually done. The strips 8 also assist in removing the heat from the armature coils with which they are in direct contact.

It is to be understood that cooling elements are preferably placed in each of the ventilating ducts 4 although, if desired, they may be provided only in some of these ducts. It should also be understood that many variations in the construction shown are possible. Thus, for example, it may be desirable in the case of very large machines to make the cooling elements in the form of segments rather than completely circular and to assemble a plurality of these segments in each duct. Also, the water supply system may be arranged in various ways, although preferably a water main will be provided extending longitudinally of the machine to which the inlet tubes 15 are connected. A similar discharge main may be provided for the discharge connections 16.

It will be seen, therefore, that a very effective means has been provided for cooling the stator cores of large dynamoelectric machines by the circulation of water and that this is done without any increase in the size of the machine or any changes in structure other than the provision of the cooling elements themselves.

Although a particular embodiment of the invention has been illustrated and described, it is to be understood that it is not limited to the particular details of construction shown, but that, in its broadest aspects, it includes all equivalent embodiments and modifications which come within the scope of the appended claims.

I claim as my invention:

1. A dynamoelectric machine comprising a stator member and a rotor member, the stator member including a core portion built up of annular laminations disposed in groups spaced from each other in the axial direction to provide a plurality of ventilating ducts therebetween, cooling means in each of said ducts comprising a plurality of pairs of tubes extending radially of the core, the tubes of each pair being connected together at their inner ends and the tubes of adjacent pairs being joined at their outer ends, a sleeve member enclosing each pair of tubes and means for circulating a liquid cooling medium through said tubes.

2. A dynamoelectric machine having a stator core composed of a plurality of annular laminations disposed in axially spaced groups to provide ducts therebetween, said laminations having substantially radial teeth on their inner peripheries forming longitudinal slots for the reception of armature conductors, a plurality of pairs of tubes in each of said ducts, each pair of tubes extending radially from the outer periphery of the core to the inner end of one of said teeth, the tubes of each pair being connected together at their inner ends and the outer ends of the tubes of adjacent pairs being joined together, an outer tubular member enclosing each pair of tubes and coextensive therewith, and means for circulating a liquid cooling medium through all of said tubes.

3. A dynamoelectric machine having a stator core composed of a plurality of annular laminations disposed in axially spaced groups to provide ducts therebetween, said laminations having substantially radial teeth on their inner peripheries forming longitudinal slots for the reception of armature conductors, a plurality of pairs of tubes in each of said ducts, each pair of tubes extending radially from the outer periphery of the core to the inner end of one of said teeth, the tubes of each pair being connected together at their inner ends and the tubes of adjacent pairs being joined together at their outer ends, an outer tubular member enclosing each pair of tubes and coextensive therewith, fins of material of good heat conductivity disposed in said ducts on each side of each pair of tubes and means for circulating a liquid cooling medium through all of the tubes.

4. A water-cooled stator for a dynamoelectric machine comprising a stator core member composed of annular laminations arranged in longitudinally spaced groups to provide ventilating ducts therebetween, the laminations having radial teeth at their inner peripheries to form longitudinal slots for the reception of armature conductors, cooling elements in at least some of said ducts, each element consisting of annular members of material of good heat conductivity substantially co-extensive with the laminations and a plurality of tubes secured between said members in a generally radial direction, the tubes being arranged in pairs disposed opposite the teeth of the adjacent laminations and extending substantially from the outer periphery of the core to the inner ends of the teeth, the tubes of each pair communicating with each other at their inner ends, connections between the outer ends of the tubes of adjacent pairs and means for circulating water through all of said tubes.

5. A water-cooled stator for a dynamoelectric machine comprising a stator core member composed of annular laminations arranged in longitudinally spaced groups to provide ventilating ducts therebetween, the laminations having radial teeth at their inner peripheries to form longitudinal slots for the reception of armature conductors, cooling elements in at least some of said ducts, each element consisting of annular members of material of good heat conductivity substantially co-extensive with the laminations and a plurality of tubes secured between said members in a generally radial direction, the tubes being arranged in pairs disposed opposite the teeth of the adjacent laminations and extending substantially from the outer periphery of the core to the inner ends of the teeth, the tubes of each pair communicating with each other at their inner ends, a sleeve member surrounding each pair of tubes and co-extensive therewith, connections between the outer ends of the tubes of adjacent pairs and means for circulating water through all of said tubes.

RENÉ A. BAUDRY.